United States Patent
Xie et al.

(10) Patent No.: US 6,658,180 B2
(45) Date of Patent: Dec. 2, 2003

(54) METHOD AND APPARATUS FOR PARALLEL OPTICAL PROCESSING FOR DUAL PORT DEVICES

(75) Inventors: Ping Xie, San Jose, CA (US); Salvador P. Tiscareno, San Jose, CA (US)

(73) Assignee: Finisar Corporation, Palo Alto, CA (US)

(*) Notice: Subject to any disclaimer, the term of this patent is extended or adjusted under 35 U.S.C. 154(b) by 311 days.

(21) Appl. No.: 09/792,920

(22) Filed: Feb. 26, 2001

(65) Prior Publication Data

US 2002/0018618 A1 Feb. 14, 2002

Related U.S. Application Data

(60) Provisional application No. 60/220,209, filed on Jul. 22, 2000, and provisional application No. 60/236,122, filed on Sep. 28, 2000.

(51) Int. Cl.[7] ............................................. G02B 6/32
(52) U.S. Cl. ..................................... 385/33; 385/39
(58) Field of Search ............................. 385/15–24, 31, 385/33–35, 39, 47, 48

(56) References Cited

U.S. PATENT DOCUMENTS

| | | | |
|---|---|---|---|
| 5,956,441 A | | 9/1999 | Fairchild et al. |
| 6,134,359 A | * | 10/2000 | Keyworth et al. ............ 385/33 |
| 6,438,290 B1 | * | 8/2002 | Bietry et al. .................. 385/33 |
| 6,546,168 B1 | * | 4/2003 | Xie et al. ...................... 385/39 |

* cited by examiner

Primary Examiner—Frank G. Font
Assistant Examiner—Michael P. Mooney
(74) Attorney, Agent, or Firm—Workman Nydegger

(57) ABSTRACT

The present invention advantageously provides a method and apparatus for the parallel optical processing of a plurality of optical beams within a 2 port optical processing unit. The optical processing unit may perform any of the functions associated with 2 port devices such as: isolators, modulators, filters etc. The present invention further advantageously provides optimal and uniform coupling between each pair of optical fibers, i.e. each discrete pair of access ports, with the optical processing unit. This is achieved in part by a precise geometric arrangement of all elements of the apparatus. The present invention further advantageously provides a reduced form factor and cost when compared with individual 2 port devices.

19 Claims, 4 Drawing Sheets

METHOD AND APPARATUS FOR PARALLEL OPTICAL PROCESSING FOR DUAL PORT DEVICES

CROSS-REFERENCE TO RELATED APPLICATION

This application claims priority from Provisional Application No.: 60/220,209, entitled "OPTICS FOR MULTI-PORT OPTIC DEVICES" filed on 7/22/00 and Provisional Application No. 60/236, 122, entitled "LENS SYSTEM FOR MULTI-BEAM OPTICAL ARRAYS" filed on Sep. 28, 2000 which are incorporated herein by reference in their entirety. This application is related to U.S. Utility Application Ser. No.: 09/659,903 filed on Sep. 12, 2000 and entitled: "METHOD & APPARATUS FOR PARALLEL OPTICAL PROCESSING" which is incorporated herein by reference.

BACKGROUND OF THE INVENTION

1. Field of the Invention

This invention generally relates to optical components generally and more particularly to parallel optical processing within a shared optical component.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

Currently this expansion of bandwidth is being accomplished by what is known as "wavelength division multiplexing" (WDM), in which separate subscriber/data sessions may be handled concurrently on a single optic fiber by means of modulation of each of those subscriber data streams on different portions of the light spectrum WDM is therefore the optical equivalent of frequency division multiplexing (FDM). Current implementations of WDM involve as many as 128 semiconductor lasers each lasing at a specific center frequency within the range of 1525–1575 nm. Each subscriber DataStream is optically modulated onto the output beam of a corresponding semiconductor laser. The modulated information from each of the semiconductor lasers is combined onto a single optic fiber for transmission. As this digital signal is passed across an optical network, it will be subject at various intervals to amplification by, for example, Erbium doped amplifiers and dispersion compensation by, for example, optical circulators with coupled Bragg filters. At each node in the network, e.g. central office or remote terminal, optical transceivers mounted on fiber line cards are provided. On the transmit side, a framer permits SONET framing, pointer generation and scrambling for transmission of data from a bank of lasers and associated drivers, with each laser radiating at a different wavelength. On the receive side, the incoming signals are separated into channels detected by photo detectors, framed and decoded.

Throughout the network a broad range of passive optical components are utilized to process optical beams from individual optical fibers.

Two port devices condition a single beam of light on a single optical path. An isolator blocks feedback to the source of an optical beam. A modulator uses an electro/magneto optic or other property of a crystal/wave guide to modulate a single beam of light passing through it. A filter blocks a portion of the spectrum of a single beam of light passing through it.

Three port devices handle more complex optical functions such as splitting/routing beams based on optical properties thereof. Three port devices, require precise alignment of two/three beams of light across two optical paths.

Circulators separate optical beams on the basis of the direction of their propagation. Thus a circulator can be used to separate the sender's and receiver's communications initially duplexed on a single optical fiber.

The multiplexers, demultiplexers, and interleavers are used to separate individual or discrete sets of channels of a WDM communication on a single optical fiber.

The power taps and splitters are used to split a single laser source into multiple optical beams at selected relative intensities.

The polarization beam splitters are used to separate arbitrarily polarized light into orthogonally polarized components. The combiners are used to perform the opposite operation.

The components are expensive to manufacture. In addition, one passive optical component is required for each optical fiber. A typical telecom installation at either the central office or relay site handles thousands of optical fibers each with their own associated passive and active components.

What is needed is a way to reduce the cost, complexity, and form factor(s) associated with providing active and passive optical components to optical fibers.

SUMMARY OF THE INVENTION

The present invention advantageously provides a method and apparatus for the parallel optical processing of a plurality of optical beams within a 2 port optical processing unit. The optical processing unit may perform any of the functions associated with 2 port devices such as: isolators, modulators, filters etc. The present invention further advantageously provides optimal and uniform coupling between each pair of optical fibers, i.e. each discrete pair of access ports, with the optical processing unit. This is achieved in part by a precise geometric arrangement of all elements of the apparatus. The present invention further advantageously provides a reduced form factor and cost when compared with individual 2 port devices.

In an embodiment of the invention an optical processor is disclosed for parallel optical processing of optical beams. The optical processor includes a first and a second lens system, an optical processor unit (OPU) and a first and a first and a second termination of optical fibers. The first lens system exhibits first focal points. The second lens system exhibits second focal points. The second lens system is spaced apart from the first lens system along a central axis in a substantially confocal configuration with respect to one another. The OPU is located between the first and the second lens system. The first and second termination of the optical fibers are displaced from one another along the central axis outside the first and the second lens systems. The first and second terminations include opposing ones of pairs of optical fibers with each pair providing two port access to said OPU. The first and second terminations are offset from the corresponding focal points of the first and second lens systems in a first direction along the central axis to reduce feedback of spurious reflection within the optical processor.

In an alternate embodiment of the invention an optical processor is disclosed with first and second lens systems spaced apart from one another in a non-confocal arrangement. The OPU is located between the first and second lens systems. The first and second terminations of the optical fibers are displaced from one another along the central axis outside said first and said second lens systems. Each of the first and second terminations are displaced from a corresponding one of the first lens system and the second lens system to locations for which the first and second lens systems effect a transverse magnification substantially equivalent to 1.

In another embodiment of the invention a method for parallel optical processing is disclosed. The method includes the acts of: effecting one of a convergence and a divergence of the optical beams from the first termination of optical fibers; optically processing the optical beams from the first termination; and effecting an other of the convergence and the divergence of the optical beams processed in said act of optically processing to form an image with a transverse magnification of substantially −1 on the second termination of optical fibers.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention provides a method and apparatus for the parallel optical processing of a plurality of optical beams within a single optical processing unit. Access to the optical processing unit is provided by opposing terminations of optical fibers the input and output of which is directed from and to the optical function unit by lenses. Each pair of optical fibers provides 2 ports of access to the optical processing unit. This allows multiple discrete optical beams each with unique optical parameters, e.g. wavelength, power, modulation, polarization, propagation direction, etc. to be individually delivered, to the optical processing unit on respective optical fibers, to be processed in parallel within the optical processing unit, and to be output individually on the appropriate ones of the optical fibers associated with each of the pairs.

Figure 1A:
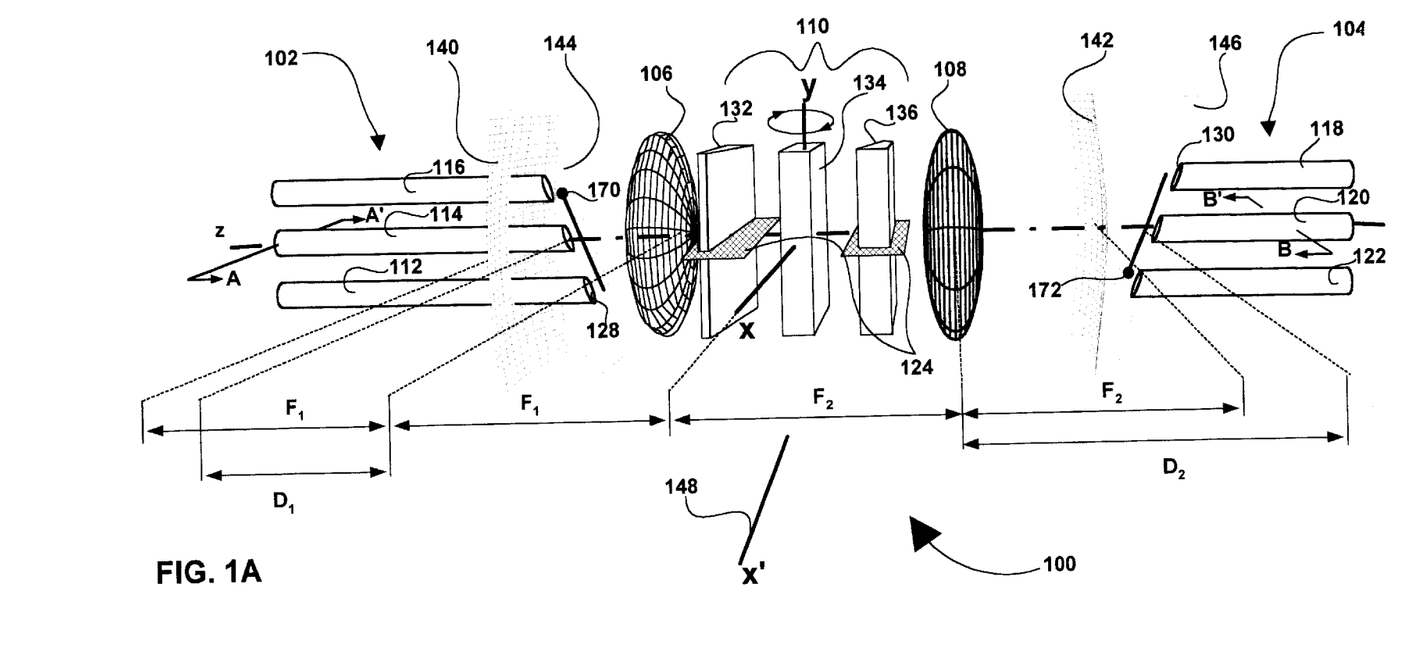
FIG. 1A is a front isometric view of an optical apparatus for parallel optical processing of optical beams on optical fibers which share an optical processing unit in accordance with an embodiment of the invention.

FIG. 1A is a front isometric view of an optical apparatus 100 for parallel optical processing of optical beams on optical fibers which share an optical processing unit in accordance with an embodiment of the invention. The entire apparatus is shown aligned with respect to the three mutually orthogonal axis of an x, y, z Cartesian coordinate system. The optical apparatus includes a first and second termination 102–104 of optical fibers, lenses 106–108, and an optical processing unit (OPU) 110. The first termination 102 includes 3 individual optical fibers 112–116. The second termination includes 3 individual optical fibers 118–122.

The layout of each of the components of the system determines the efficiency and uniformity of the optical coupling of the fibers with one another via the lenses and OPU. The optical fibers on each of the terminations are oriented in groups of 2, i.e. pairs, each of which may be utilized to access the optical processing unit independently of the other. One member of each pair is located on one of the terminations and the remaining member of the pair is located on the other of the two terminations.

The fibers within each termination are aligned in opposing rows which are parallel to one another, and in the example shown in the plane defined by the Z-Y axis. In the embodiment shown there are a total of 6 optical fibers which are grouped to form 3 pairs. The first pair is formed by the optical fibers 116, 122. The second pair is formed by optical fibers 114, 120. The third pair is formed by optical fibers 112, 118.

Coupling between source and target fibers is a function of a number of factors including: optical path lengths; image size, spurious reflections, and the geometry of the fiber termination. Optimal coupling of all source and target fibers of each pair of fibers requires substantially equal optical path lengths along each beam path. In the embodiment of the invention shown in FIG. 1A this is accomplished by staggering the members of each pair within their corresponding terminations. In the confocal arrangement of FIG. 1A the complementary angles of the planar terminations match the beam path lengths between each of the fiber pairs. This has the additional benefit of allowing the beveling of the interfaces at the ends of each of the fibers to be accomplished by polishing the termination as a whole rather than the fibers individually. Since source and target fibers are substantially identical in size, coupling efficiency also requires consistent beam size at source and target fibers. Collectively this concept is described as 1-to-1 imaging, referring to positioning of the fibers at opposing image points at which the cross-sectional size of the source beams and target beams are equal. Equal image sizing in the confocal embodiment shown in FIG. 1A can be achieved by placing the fibers at or at offsets equal in sign along the central "z" axis from the focal points of the lenses 106–108. Where the lenses are substantially identical the offsets along the z axis are substantially identical. The problem with the former approach, positioning on the focal points is that assembly of the device is significantly complicated and the effects of spurious reflections off the OPU and the resultant feedback to the source fiber are not mitigated. In order to reduce the effect of spurious feedback of optical energy reflected by the OPU the source fiber and target fiber of each two port pair need to be shifted/offset in the same direction along the z axis. This places one set of fiber terminations outside the corresponding focal point where the beams diverge, and the other set of fiber terminations inside the corresponding focal point where the beams converge. 1-to-1 imaging is still maintained. Additionally, the feedback coupling between spurious reflections off the OPU and the source fiber is also reduced by this arrangement since the reflections off the OPU strike the source fiber with a cross-sectional footprint larger than the fiber. Thus a portion of the reflected energy does not couple with the source fiber as will be discussed in greater detail in connection with FIG. 2D. The geometry of the fiber terminations also improves coupling. Beveling of the substantially planar terminations of the individual fibers reduces spurious feedback. The combined beveling of the fiber ends and the angulation at complementary angles of the planar terminations of the fiber terminations has the additional benefit of centering the optical beams passed between individual source and target fibers on the two terminations within the acceptance cones of the respective source and target fibers. The acceptance cone is defined to have a half-angle θ max beyond which angle rays incident to the interface of the fiber will leak out of the optical fiber. In the orientation of planar terminations and fiber bevels shown in FIG. 1A output beams from the fibers are refracted downward, i.e. in the negative direction along the y axis and away from the normal to the beveled surface of each fiber. Light that is coupled between source and target ports of each fiber pair 116, 122 and 114, 120 and 112, 118 follow paths that cross one another at the inner focal point between the two lenses and approach the opposing target fiber in an upward trajectory (along the y axis) that lies within the acceptance cone of the corresponding target fiber.

Geometrically, the embodiment shown in FIG. 1A achieves these objectives are achieved in the following manner. Each optical fiber has a beveled end/interface. Interface 128 forms the end of optical fiber 112. This fiber is the single member of the pair which includes opposing fiber 118. Interface 130 forms the end of optical fiber 118. Each of the remaining fibers has its own individual interface. The interfaces of the fibers 112–116 on the first termination are beveled and staggered to form a substantially planar termination aligned with plane 144. The interfaces of the paired fibers 118–122 on the second termination are beveled and staggered to form a substantially planar termination aligned with plane 146. These planar terminations are aligned with the z axis at complementary obtuse angles to one another. In an embodiment of the invention the angles of the substantially planar terminations of the fiber terminations with respect to the longitudinal "z" axis range from +/−94 degrees to +/−100 degrees. The angles of the planar terminations of the fiber terminations are oriented with respect to one another to improve the optical coupling between source and target fibers. The substantially planar terminations 144–146 of the fiber terminations are parallel to the x axis, thus projections thereof intersect at line 148 which is parallel to the x axis. In the embodiment shown the pair of lenses 106–108 are used to direct optical beams from either of the terminations toward the optical processing unit 110. Geometrically, the optical centers of the lenses 106–108, is located in the plane formed by the x–z axis.

Between the lenses, the focal point $F_1$ of lens 106 and $F_2$ for lens 108 are substantially coincident. In an embodiment of the invention lenses 106 and 108 have identical focal points. Outside the lenses the focal planes 140 for lens 106 and 142 for lens 108 are shown.

The ends of the fiber terminations are placed at complementary offsets with respect to the focal planes 140–142. Thus termination plane 144 of termination 102 lies inside focal plane 140 while termination plane 146 of termination 104 lies outside focal plane 142. The complementary offsets of these terminations with respect to their associated focal plane provides a matching of the optical convergence of one termination lens system with the optical divergence of the other. The 1-to-1 imaging achieved by the above discussed geometry is represented by image icons 170–172 shown at their corresponding fiber terminations 102–104 respectively. In addition to reducing spurious feedback as discussed above and as will be discussed in FIG. 2D, the complementary offsets reduce the amount of spurious feedback into the fibers resulting from reflections of the optical beam from the optical processing unit as shown in FIG. 2D. Finally, the lack of a requirement for positioning of the fiber terminations in the focal plane greatly simplifies assembly.

Typically, assembly proceeds by locating and fixing one termination with respect to the optical processing unit and lens. In the current invention the first termination is fixed with respect to the optical processing unit and lens. The first termination is located as much inside the focal plane of the associated lens as is mechanically and optically practical. Then the opposing termination is located and fixed with respect to the optical processing unit and associated lens at a location outside the focal plane of the associated lens. The exact location can be determined using an optical driver coupled to each of the fibers and a power monitoring circuit to determine optimal coupling for the assembly. Since positioning of the fiber terminations is relative (offset from the focal points) rather than absolute (at the focal points) parallel processing units fabricated in accordance with the teachings of the current invention may be more easily and less expensively fabricated than their prior art counterparts.

The lens system chosen for the optical apparatus will play a major role in determining the coupling efficiency of the device. Several requirements must be met. Aberrations must be minimized. The lens system must offer the same optical performance between optical fibers displaced from the optical axis, i.e. the z axis, as it does for those on the axis. Additionally, the lens system must provide a large working distance between its exterior surfaces and its focal point, to allow for the more complex optical processing units associated with 3 port devices. An aspherical lens meets both the above requirements.

Reducing the effects of the resulting aberrations on coupling losses is critical to the implementation of the subject invention. An aspherical lens minimizes the primary aberrations affecting the parallel optical processing of multiple optical beams. These aberrations are: spherical aberration, coma, and field curvature.

Spherical aberration of a lens arises from the light rays passing through a lens at different heights from the optical axis, e.g. the z axis. Light rays at greater distances from the optical axis refract at a higher angle at the first lens surface. Without the corrections of the spherical aberrations, the energy carried by the light wave will not be focused at a central location making it more difficult to collect the energy in the output fiber. An aspherical lens minimizes these aberrations by changing the shape of the lens from having surfaces that are defined by a fixed radius to having non-spherical surfaces (aspheric). Having one focal point for all rays passing through the lens results in a more efficient transfer of light energy from the in out fiber to the output fiber.

Coma: Light rays that are off axis and at an angle to the optical axis will focus at different points on the focal plane depending on the height and angle the ray makes relative to the optical axis. This spreading of the focal point results in a spreading of the light energy away from a central point resulting in a lower coupling efficiency. An aspherical minimizes coma by providing a large numerical aperture sufficient to accept optical beams that are not parallel with the optical axis. In an embodiment of the invention the aspherical lens exhibit numerical aperture in the range of 15–50

Field curvature of a lens results from light rays that are off center and at an angle from the optical axis. This type of aberration is similar to that of coma but field curvature effects different groups of parallel light rays differently regardless of the diameter of the group of light rays. The behavior of field distortion causes the flat focal plane of paraxial theory to become curved.

For an axially symmetric lens the field curvature of the focal plane is symmetric about the optical axis making it a three-dimensional "cup shape" such as that shown for focal planes 140–142. Placement of the fiber tips would ideally be placed at locations on the curved plane symmetrically around the optical axis. In this configuration the fiber tips all share the same focal distance from the lens and the beams from the collimator would be collimated. For ease of manufacture however, the fiber interfaces result from the cleaving of the fibers in terminations in a single capillary tube for ease of handling during polishing and assembly. The ideal polish angle for the fiber termination is 8 degrees. Polishing a termination of fibers that are placed symmetrically around the optical axis would result in the fiber tips existing on a slanted plane, i.e. planes 144–146 leaving opposing fibers off of the focal plane. The beams emerging from the lens would then be either slightly focused or slightly diverging. The geometry shown in FIG. 1A corrects for these differences by providing offsetting diverging and converging locations for the single and paired members of each pair with respect to the focal planes of their corresponding lenses. In this configuration it is possible to efficiently couple light from one input fiber to the respective output fiber although neither one of the fiber tips are on the curved focal planes.

The final component in the apparatus is the optical processing unit (OPU) 110. This unit provides the actual bending or splitting of the incident optical beams. Its alignment promotes optimal coupling to the extent that it too exhibits certain symmetries with the other components of the system. The OPU is in a preferred embodiment of the invention located proximate the substantially coincident focal points of the lenses 106–108.

In an embodiment of the invention the OPU functions as a multi-port isolator. In an embodiment of the invention that isolator includes a 45° Faraday rotator 134 sandwiched between a pair of birefringent wedges 132, 136 with optic axes oriented at 45° with respect to one another. The principal plane(s) 124 of the wedges lie in the x–z plane. The principal plane(s) contain the optic axis. This assures that any non-reciprocal splitting/walkoff of an incident optical beam into "e" and "o" rays will be characterized by bending about the y axis. This results in beam paths for isolated beams, i.e. beams on the reverse or isolated path (See FIG. 2C) that fall outside the plane formed by the z-y axis, i.e. the plane in which the fibers of both fiber terminations are arranged. This improves the isolation efficiency of the two port isolator since it assures that on the reverse path the "e" and "o" rays do not fall on the opposing port or any of the other fibers sharing the same termination, all of which are aligned in the z-y plane which is orthogonal to the principal plane(s) 124 of the wedges 132, 136.

Figure 1B:
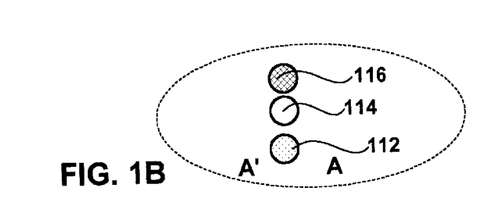
FIGS. 1B, C are end views at sections A–A' and B–B' of the configuration of optical fibers terminations shown in FIG. 1A.
Figure 1C:
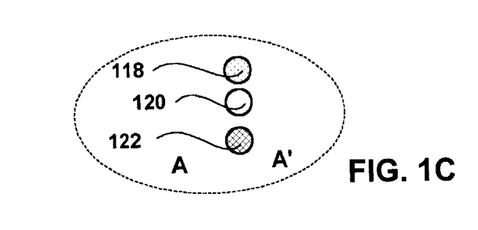

FIGS. 1B, C are end views at sections A–A' and B–B' of the configuration of optical fibers terminations shown in FIG. 1A. The opposing members of each pair are shown with the same hatch pattern. Thus members 116, 122 and 114, 120 and 112, 118 are paired with one another respectively.

Figure 2A:
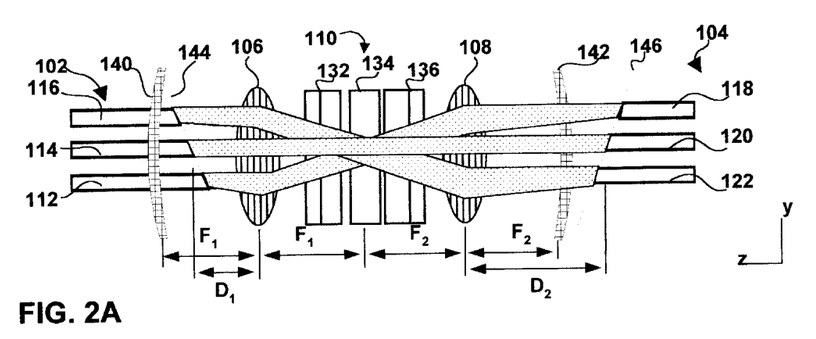
FIG. 2A is a side elevation view of the optical apparatus shown in FIG. 1A with an optical processing unit configured as an isolator.

FIG. 2A is a side elevation view of the optical apparatus shown in FIG. 1A with an optical processing unit configured as an isolator. Lenses 106–108 are shown directing light toward the optical processing unit 110. In the example shown the OPU is processing light in a manner appropriate for an optical isolator. On a forward path light emanating from an input port, e.g. ports 112, 114, 116, each couple optically with the corresponding one of output port 122, 120, 118 respectively. On the reverse path such coupling does not take place.

Figure 2B:
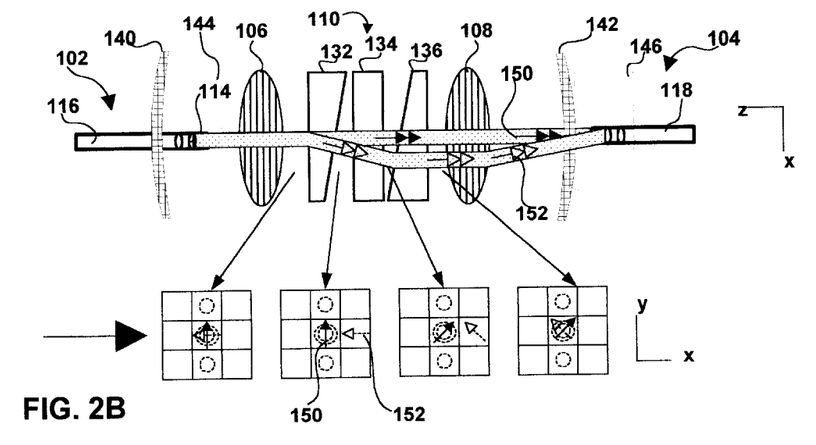
FIG. 2B is a top plan view of the optical apparatus shown in FIG. 1A as well as a polarization diagram of the ordinary and extraordinary rays on the forward path through the isolator shown in FIG. 2A.

FIG. 2B is a top plan view of the optical apparatus shown in FIG. 1A as well as a polarization diagram of the ordinary and extraordinary rays on the forward path through the isolator shown in FIG. 2A. In FIG. 2A the forward path for light between ports 114 and 118 is shown. The first wedge 132 splits the light into "o" ray 150 and "e" ray 152. The rotator 134 effects a non reciprocal 45° rotation on both rays. The second wedge 136 with an optical axis at 45° with respect to the first wedge causes both rays to exit the second plate parallel to one another where they are focused by lens 108 on the corresponding output fiber 118.

Figure 2C:
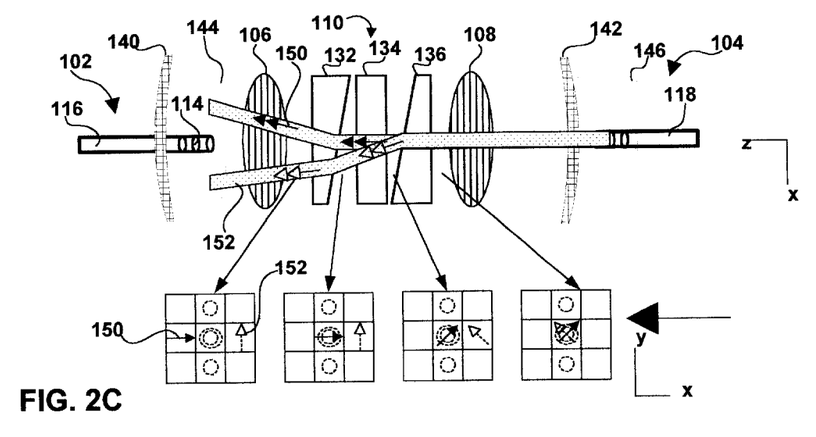
FIG. 2C is a top plan view of the optical apparatus shown in FIG. 1A as well as a polarization diagram of the ordinary and extraordinary rays on the reverse path through the isolator shown in FIG. 2A.

FIG. 2C is a top plan view of the optical apparatus shown in FIG. 1A as well as a polarization diagram of the ordinary and extraordinary rays on the reverse path through the isolator shown in FIG. 2A. On the reverse path light entering the isolator from port 18 is split into "e" and "o" rays by the first wedge 136. The rays experience a non-reciprocal rotation within the Faraday rotator 134. When compared with the forward path, the polarization vectors of the "e" and "o" rays are reversed. Thus within the final wedge 132 it is the ray centered on the optical axis, i.e. ray 150 which walks off resulting in the "o" ray 150 and the "e" ray 152 diverting outside of, on either side of the z-y plane thus avoiding optical coupling with the fiber 114 which lies in the z-y plane.

Figure 2D:
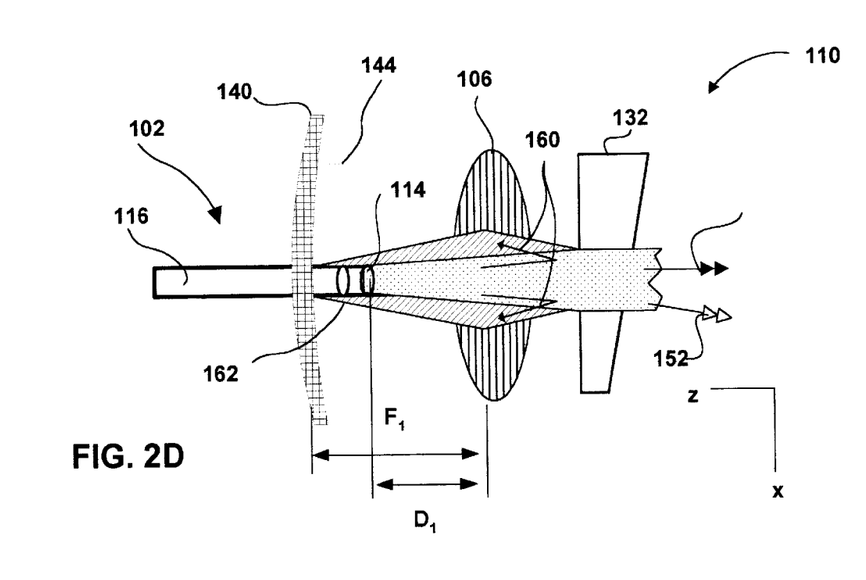
FIG. 2D is an exploded top plan view of the optical apparatus shown in FIG. 2B showing an end of the device and a configuration thereof which reduces spurious reflection from the optical isolator to the input fiber.

FIG. 2D is an exploded top plan view of the optical apparatus shown in FIG. 2B showing an end of the device and a configuration thereof which reduces spurious reflection from the optical isolator to the input fiber. As an optical beam 150–152 strikes the face of wedge 132 a portion of the beams energy 160 is reflected back toward the input port 114. The coupling of that energy to the input port negatively impacts the isolation of that port from feedback. The amount of feedback is reduced in the current invention by positioning of the fiber terminations at offsets inside or outside the focal plane of the lens 106. In either event the aperture 162 of the reflected energy 160 at the tip of the input fiber will exceed the cross-sectional area of the fiber, thus reducing the feedback coupling and improving the isolation of the input port from spurious reflections off the isolator. Were the fiber termination to be positioned at the focal plane such would not be the case since the aperture 162 would have a cross sectional area substantially similar to that of the fiber tip.

Figure 2E:
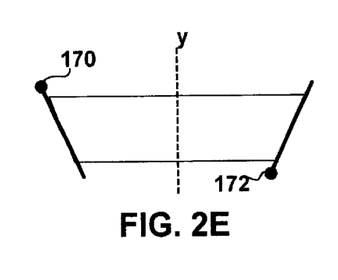
FIG. 2E shows a planar schematic diagram of the optical imaging of the parallel optical processor shown in FIG. 1A.

FIG. 2E shows a planar schematic diagram of the optical imaging of the parallel optical processor in the confocal configuration shown in FIG. 1A. Object and image icons 170–172 are shown in the orientations set forth in FIG. 1A at complementary angles and inverted with respect to one another in the z-y plane.

Figure 2F:
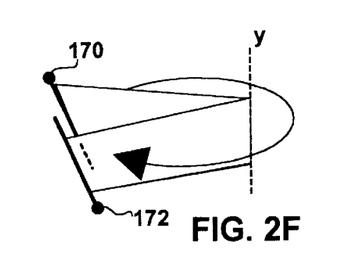
FIG. 2F shows the folding of the planar schematic diagram of FIG. 2E such as results from spurious reflections.

FIG. 2F shows the folding of the planar schematic diagram of FIG. 2E about the y axis, such as results from spurious reflections. Object and image icons 170–172 are shown overlapping one another in the z-y plane and mutually inverted. Beams entering the isolator may be reflected or folded back on themselves from any of the surfaces of the isolator. If all the beams emanate from termination 102 then icon 170 represents the object formed thereby. In that case icon 172 corresponds to the image formed by the beams originating from termination 102 and arriving at termination 104. Where, as here, the object/image icons are superimposed with one another after folding, the feedback from spurious reflections couples optimally with the object termination or fibers within that termination. This reduces the efficiency of the optical processor 100 (see FIG. 1A).

To reduce the feedback, the opposing terminations 102–104 are offset on opposite sides of the focal points of their respective lenses. In the configuration shown this is achieved by shifting both terminations 102–104 in the same direction (+/−) along the z axis. Where the focal points of the lenses 106–108 are equal, the offsets are opposing complementary amounts from the respective focal points. The amount of the offset determines the cross-sectional footprint of the reflections. The ratio of the cross-sectional area of the fiber face to the cross-sectional area of the spurious reflections corresponds generally with the coupling efficiency. Offsetting the fiber terminations reduces this ratio thereby reducing spurious feedback, and improving the efficiency of the overall device. This capability is particularly critical where the OFU is configured as an isolator. Spurious feedback is detrimental to the performance of an isolator, the whole purpose of which is to avoid feedback to the fibers which are the source of the optical beams.

Figure 3A:
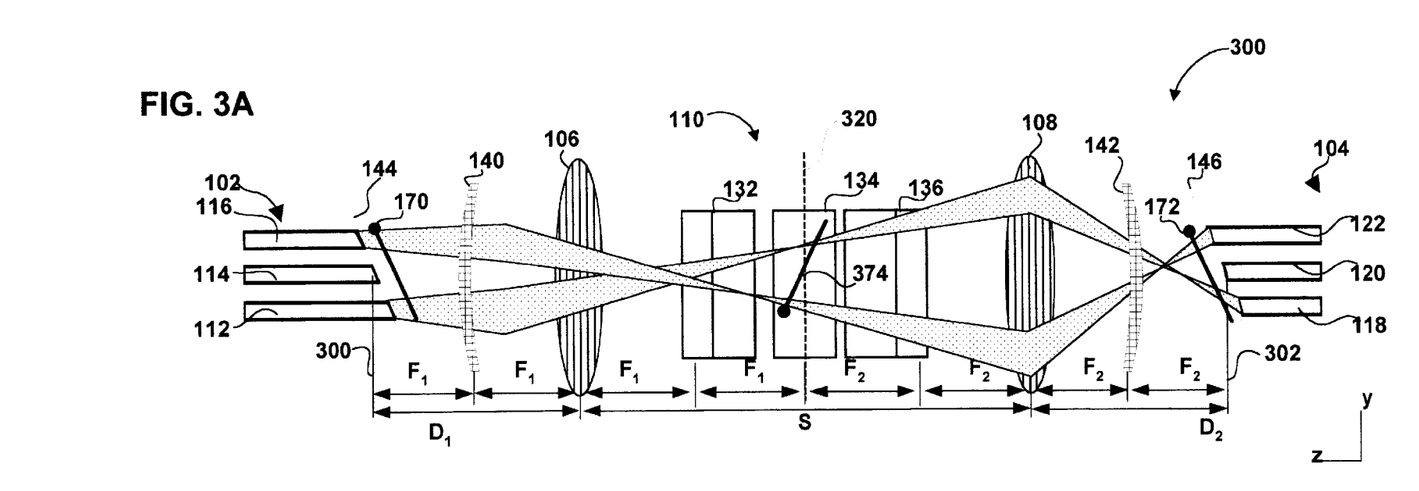
FIG. 3A is a side elevation view of an alternate embodiment of the optical apparatus configured to accommodate optical processing units with increased form factors.

FIG. 3A is a side elevation view of an alternate embodiment of the optical apparatus configured to accommodate optical processing units with increased form factors. Form factors for optical isolators and other such 2 port devices may exceed the intra-lens spacing provided by the confocal arrangement shown in FIG. 1A. Where this is the case an alternate embodiment of the parallel optical processor may be utilized for parallel processing. In this embodiment optimal coupling including 1-to-1 imaging remains an objective with the additional requirement of increased spacing between lenses. In this embodiment of the invention 1-to-1 imaging as represented by image icons 170–172 is achieved between both fiber terminations 102–104 respectively as well as for the intermediate image 374 formed between the lenses 106–108. In the embodiment shown the spacing between lenses 106–108 is twice that shown in FIG. 1A. The following Equation 1 expresses the general requirement for the compound lens configurations shown in the parallel processors of FIG. 1A and FIG. 3. that 1-to-1 imaging be applied throughout the device. This requirement corresponds with the requirement that the traverse magnification of the device should equal +/−1. The following Equation 1 sets forth the range of configurations which meet this requirement, expressed in terms of $f_1$, the focal length of first lens, S the separation between lenses, $D_1$ the spacing between the first termination 102 and lens 106, and $D_2$ the spacing between the second termination 104 and lens 108.

$$M_T \equiv \pm 1 = \frac{f_1 D_2}{S(D_1 - f_1) - D_1 f_1} \quad \text{Equation 1}$$

To determine the appropriate configuration of the parallel processing device the following example will be instructive. Where in FIG. 1A the spacing S between lenses equals $2f_1$ Thus for a spacing $S_L$ between lenses of 4 focal lengths, the spacing between the either lens and the corresponding focal plane $S_{FP}$ would be twice the focal length of the lens. The planes 142, 144 defined by the opposing fiber terminations 104, 102 respectively are aligned at substantially identical angles to one another about the optical "z" axis. This configuration maintains 1-to-1 imaging and equal optical path lengths for the plurality of port pairs.

Figure 3B:
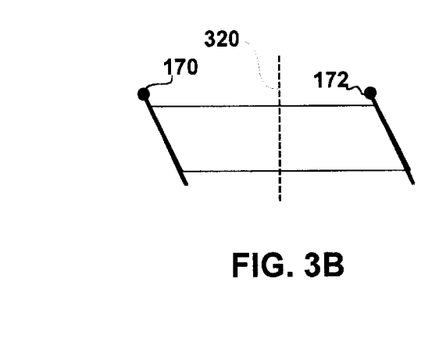
FIG. 3B shows a planar schematic diagram of the optical imaging of the parallel optical processor shown in FIG. 3A.

FIG. 3B shows a planar schematic diagram of the optical imaging of the parallel optical processor shown in FIG. 3A. Object and image icons 170–172 are shown in the orientations set forth in FIG. 3A at equal angles and inverted with respect to one another in the z-y plane. This corresponds with the non-confocal arrangement shown in FIG. 3A.

Figure 3C:
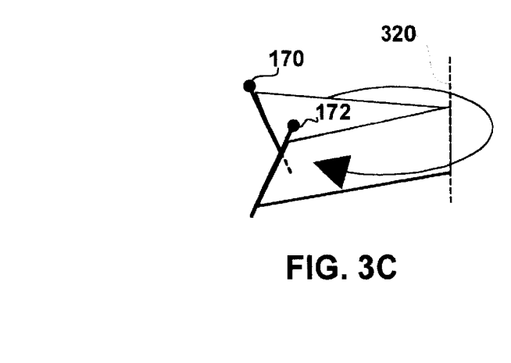
FIG. 3C shows the folding of the planar schematic diagram of FIG. 3B such as results from spurious reflections.

FIG. 3C shows the folding of the planar schematic diagram of FIG. 3B about the y axis, such as results from spurious reflections. Object and image icons 170–172 are shown at complementary angles to one another about the x axis and mutually inverted with respect to each other. Beams entering the isolator may be reflected or folded back on themselves from any of the isolator surfaces. If all the beams emanate from termination 102 then icon 170 represents the object formed thereby. In that case icon 172 corresponds to the image formed by the beams originating from termination 102 and arriving at termination 104. Where, as here, the object/image icons do not overlap with one another after folding, the feedback from spurious reflections is minimized already. Thus the offsets of the terminations is not required and both terminations 102–104 are positioned at equal displacements from their respective lenses. Where the lenses 106–108 have equal focal lengths the displacement of the terminations from each focal point is equivalent.

Similar reprocessing may be achieved for the listed and other OPU processes with equal advantage.

In alternate embodiments of the invention the single lenses 106–108 may instead be replaced with opposing lens units displaced apart from one another along the central "z" axis. Each lens unit may comprise a single lens, e.g. lens 106 or 108 or a compound lens.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An optical processor for parallel optical processing of optical beams, and the optical processor comprising:

a first lens system exhibiting first focal points;

a second lens system exhibiting second focal points, and said second lens system spaced apart from said first lens system along a central axis in a substantially confocal configuration with respect to one another;

an optical processing unit (OPU) located between said first and said second lens system; and a first termination and a second termination of optical
fibers displaced from one another along the central axis
outside said first and said second lens systems and with
each of said second termination and said first termination including opposing ones of pairs of optical fibers
with each pair providing two port access to said OPU,
and with each of said first termination and said second
termination offset from the corresponding focal points
of said first lens system and said second lens system in
a first direction along the central axis to reduce feedback of spurious reflection within the optical processor.

2. The optical processor of claim 1, wherein said first lens system and said second lens system each comprise one of a compound lens and a single lens.

3. The optical processor of claim 1, wherein said first lens system and said second lens system each comprise a corresponding aspherical lens.

4. The optical processor of claim 1, wherein said OPU comprises one of an isolator, a modulator and a filter.

5. The optical processor of claim 1, wherein said first termination of optical fibers defines a first column and said second termination of optical fibers define a second column with the first column and the second column at substantially complementary angles to one another within a first plane.

6. The optical processor of claim 5, wherein said OPU comprises an isolator with principal planes substantially normal to the first plane to direct light on a reverse path between any two ports away from the corresponding one of the first column and the second column.

7. The optical processor of claim 1, wherein said first termination of optical fibers defines a first column and said second termination of optical fibers defines a second column with the first column and the second column containing in reverse order opposing members of each pair of optical fibers, and with the first and second columns oriented to provide substantially equal path lengths among the pairs of optical fibers.

8. The optical processor of claim 1, wherein said first termination of optical fibers defines a first column and said second termination of optical fibers defines a second column substantially equal in a vertical dimension with one another, and with said first lens system and said second lens system effecting a transverse magnification of optical beams projected from corresponding fibers within the first column and the second column substantially equivalent to −1.

9. An optical processor for parallel optical processing of optical beams, and the optical processor comprising:
a first lens system exhibiting first focal points;
a second lens system exhibiting second focal points, and said second lens system spaced apart from said first lens along a central axis in a substantially non-confocal configuration with respect to one another;
an optical processing unit (OPU) located between said first and said second lens system; and
a first termination and a second termination of the optical fibers displaced from one another along the central axis outside said first and said second lens systems and with each of said second termination and said first termination including opposing ones of pairs of optical fibers with each pair providing two port access to said OPU, and with each of said first termination and said second termination displaced from a corresponding one of the first lens system and the second lens system as locations for which said first lens system and said second lens system effect a transverse magnification substantially equivalent to 1.

10. The optical processor of claim 9, wherein said first lens system and said second lens system each comprise one of a compound lens and a single lens.

11. The optical processor of claim 9, wherein said first lens system and said second lens system each comprise a corresponding aspherical lens.

12. The optical processor of claim 9, wherein said OPU comprises one of an isolator, a modulator and a filter.

13. The optical processor of claim 9, wherein said first termination of optical fibers defines a first column and said second termination of optical fibers define a second column with the first column and the second column at substantially equivalent angles to one another within a first plane.

14. The optical processor of claim 13, wherein said OPU comprises an isolator with principal planes substantially normal to the first plane to direct light on a reverse path between any two ports away from the corresponding one of the first column and the second column.

15. The optical processor of claim 9, wherein said first termination of optical fibers defines a first column and said second termination of optical fibers defines a second column with the first column and the second column containing in order opposing members of each pair of optical fibers, and with the first and second columns oriented to provide substantially equal path lengths among the pairs of optical fibers.

16. A method for parallel optical processing of optical beams between a first termination of optical fibers and a second termination of optical fibers and with each of said second termination and said first termination including opposing ones of pairs of optical fibers with each pair providing two ports, and the method for parallel optical processing comprising the acts of
effecting one of a convergence and a divergence of the optical beams from the first termination;
optically processing the optical beams from the first termination; and
effecting an other of the convergence and the divergence of the optical beams processed in said act of optically processing to form an image with a transverse magnification of substantially −1 on said second termination of optical fibers.

17. The method for parallel optical processing of claim 16, wherein the act of optically processing further comprises the act of:
optically isolating the optical beams.

18. The method for parallel optical processing of claim 17, wherein the act of optically processing further comprises the acts of:
aligning the optical fibers in the first termination and the second termination coplanar with one another in a first plane; and
splitting optical beams on reverse paths between opposing pairs of optical fibers into "e" rays and "o" rays which diverge from one another on opposing sides of the first plane; and
splitting optical beams on forward paths between opposing pairs of optical fibers into "e" rays and "o" rays which converge toward one another and the first plane.

19. The method for parallel optical processing of claim 17, wherein the act of optically processing further comprises the act of
forming an intermediate real image for each of the optical beams.

* * * * *